United States Patent
Kruse et al.

(10) Patent No.: US 10,108,630 B2
(45) Date of Patent: Oct. 23, 2018

(54) CLUSTER UNIQUE IDENTIFIER

(75) Inventors: David Matthew Kruse, Kirkland, WA (US); Diaa E. Fathalla, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/082,315

(22) Filed: Apr. 7, 2011

(65) Prior Publication Data

US 2012/0259912 A1    Oct. 11, 2012

(51) Int. Cl.
*G06F 17/30* (2006.01)
*G06F 11/14* (2006.01)

(52) U.S. Cl.
CPC .... *G06F 17/3012* (2013.01); *G06F 17/30082* (2013.01); *G06F 17/30091* (2013.01); *G06F 17/30581* (2013.01); *G06F 11/14* (2013.01)

(58) Field of Classification Search
CPC ......... G06F 17/30082; G06F 17/30091; G06F 17/30581; G06F 11/14
USPC ................................. 709/203, 217, 219, 227
See application file for complete search history.

(56) References Cited

U.S. PATENT DOCUMENTS

| | | | |
|---|---|---|---|
| 5,828,876 A | 10/1998 | Fish | |
| 6,047,332 A | 4/2000 | Viswanathan | |
| 6,622,163 B1 | 9/2003 | Tawill et al. | |
| 6,694,335 B1 * | 2/2004 | Hopmann | G06F 17/30581 707/624 |
| 7,185,076 B1 | 2/2007 | Novaes et al. | |
| 7,502,860 B1 * | 3/2009 | Champagne | H04L 47/10 370/252 |
| 7,627,706 B2 | 12/2009 | Kaushik | |
| 2003/0229545 A1 | 12/2003 | Veres et al. | |
| 2004/0098490 A1 | 5/2004 | Dinker | |
| 2005/0160413 A1 | 7/2005 | Broussard et al. | |
| 2005/0273505 A1 * | 12/2005 | Kim | H04L 29/1232 709/220 |
| 2006/0067244 A1 | 3/2006 | Sekaran et al. | |
| 2007/0277227 A1 * | 11/2007 | Brendel | G06F 17/30091 726/3 |

(Continued)

FOREIGN PATENT DOCUMENTS

| | | | |
|---|---|---|---|
| CN | 101238680 A | 8/2008 | |
| CN | 101883181 A | 11/2010 | |

(Continued)

OTHER PUBLICATIONS

"Cluster Management", IBM—AIX Version 7.1, (First Edition Sep. 2010), Retrieved Feb. 4, 2011; 36 pages.

(Continued)

*Primary Examiner* — Barbara B Anyan

(57) ABSTRACT

Described are embodiments for providing unique identifiers for files or objects across servers in a server cluster. Embodiments include generating a unique identifier that includes at least three portions. The first portion includes a node identifier which identifies the particular server in a cluster which created the unique identifier. The second portion includes a major sequence number that is incremented when a server is rebooted or otherwise taken off-line and then brought back online. Additionally, the major sequence number is incremented when all of the minor sequence numbers, which are included in a third portion of the unique identifier, have been used. The minor sequence numbers in the third portion are incremented for every unique file or object requested.

20 Claims, 7 Drawing Sheets

(56) References Cited

U.S. PATENT DOCUMENTS

| | | | | |
|---|---|---|---|---|
| 2008/0243950 | A1* | 10/2008 | Webman | G06F 11/14 |
| 2008/0243952 | A1* | 10/2008 | Webman | G06F 11/2097 |
| 2009/0192978 | A1 | 7/2009 | Hewett et al. | |
| 2011/0196900 | A1* | 8/2011 | Drobychev | G06F 17/30082 707/812 |
| 2013/0095866 | A1* | 4/2013 | Yang | H04M 1/72552 455/466 |

FOREIGN PATENT DOCUMENTS

| | | |
|---|---|---|
| EP | 1734451 A1 | 12/2006 |
| WO | 2009029783 A2 | 3/2009 |

OTHER PUBLICATIONS

"HP Open VMS Systems Documentation", <http://h71000.www7.hp.com/doc/731final/4477/4477pro_019.html,>, Retrieved Feb. 7, 2011; 5 pages.

"Sheepdog", Design Sheepdog Project, <http://www.osrg.net/sheepdog/design.html,>, Retrieved Feb. 7, 2011; 3 pages.

W. Elmenreich, W. Haidinger, R. Kirner, T. Losert, R. Obermaisser and C. Trodhandl, "TTP/A Smart Transducer Programming—A Beginner's Guide", Published Nov. 13, 2002; 51 pages.

PCT International Search Report and Written Opinion in International Application PCT/US2012/032630, dated Jan. 3, 2013, 9 pgs.

European Search Report Issued in European Patent Application No. 12768552.7, dated Nov. 19, 2014, 6 Pages.

European Communication mailed in European Patent Application No. 12768552.7, dated Dec. 5, 2014, 1 Page.

"First Office Action and Search Report Issued in Chinese Patent Application No. 201280016717.4", dated May 5, 2015, 17 Pages.

"Third Office Action Issued in Chinese Patent Application No. 201280016717.4", dated Mar. 28, 2016, 13 Pages.

"Second Office Action Issued in Chinese Patent Application No. 201280016717.4", dated Dec. 25, 2015, 16 Pages.

Chinese Notice of Allowance in Application 201280016717.4, dated Sep. 29, 2016, 6 pages.

\* cited by examiner

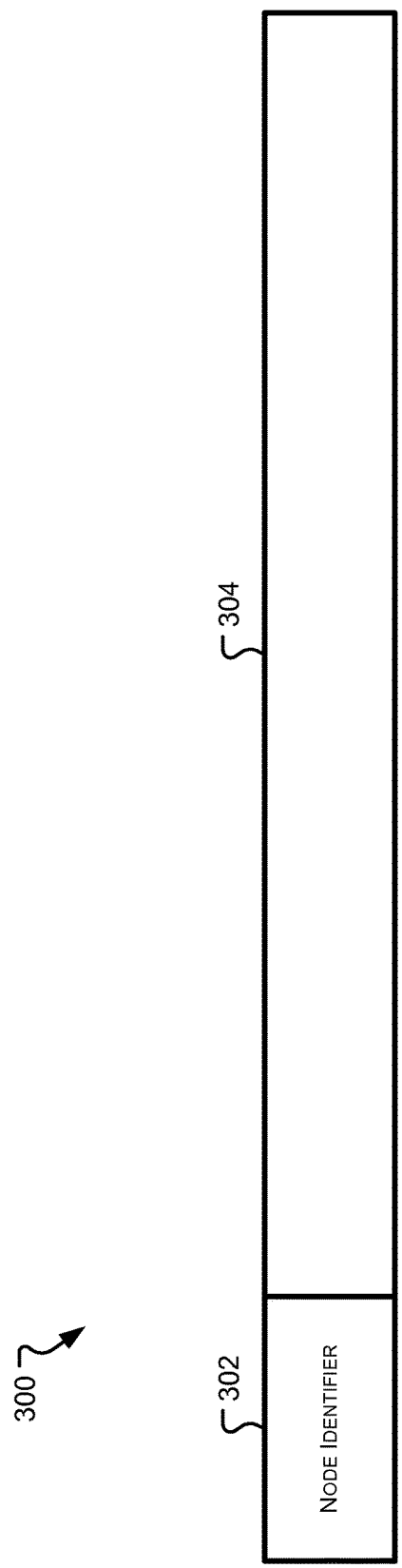

CLUSTER UNIQUE IDENTIFIER

BACKGROUND

Systems that utilize a single server for storing information that is accessed by one or more clients generally do not have issues with generating unique identifiers for objects, e.g., files. However, when systems expand to include, for example, a server cluster with a number of servers, there must be some mechanism in place for ensuring that files or other objects have identifiers that are unique within the server cluster. As can be appreciated, if one server in the server cluster fails, the other servers must be able to carry the load of the failed server. Having unique identifiers ensures that a client, which previously accessed the failed server, can send the identifier to any server in the server cluster and access the same object or file. Also, it is not practical from a performance perspective to implement a system that checks every identifier among all the nodes in a cluster before generating the identifier.

In addition, the cluster, and the servers within the cluster, may be configured to communicate with clients using a predetermined set of protocols. Thus, in addition to having to generate identifiers that are unique across a server cluster, the identifiers have to meet the requirements of the protocols such as specific structure, size, format, etc. as dictated by the protocols.

It is with respect to these and other considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described are embodiments for providing unique identifiers for files or objects across servers in a server cluster. Embodiments include generating a 64-bit identifier that includes at least three portions. The first portion includes a node identifier which identifies the particular server in a server cluster which created the unique identifier. The second portion includes a major sequence number that is incremented when a server is rebooted or otherwise taken off-line and then brought back online. Additionally, the major sequence number is incremented when all of the minor sequence numbers, which are included in a third portion of the unique identifier, have been used. The minor sequence numbers in the third portion are incremented for every unique file or object requested. The minor sequence numbers fall within a particular range. When the minor sequence numbers within the range are all used, the major sequence number is incremented and the minor sequence numbers within the range are reused.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

FIG. 3 illustrates a unique session identifier consistent with some embodiments.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
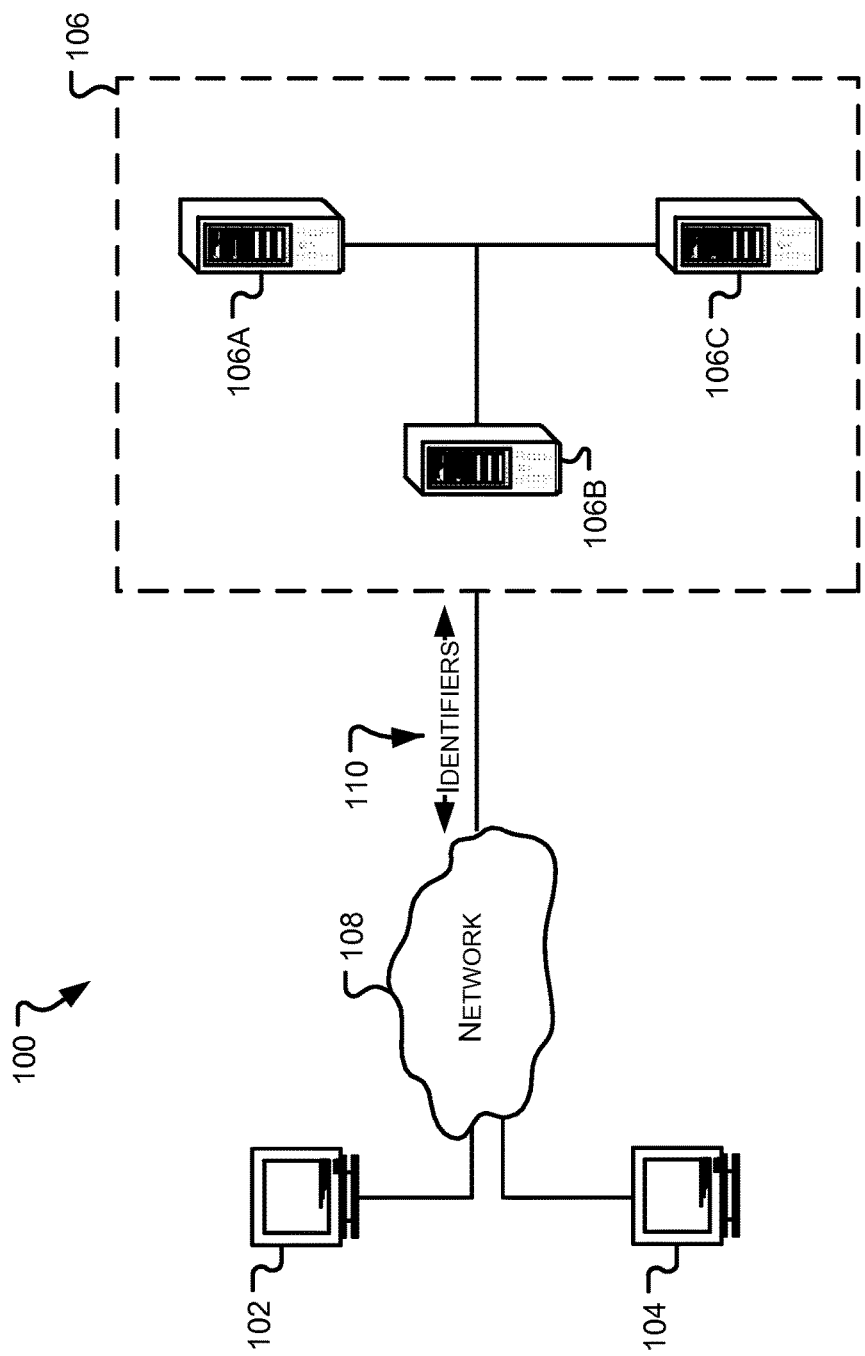
FIG. 1 illustrates an embodiment of a system that may be used to implement embodiments.

FIG. 1 illustrates a system 100 that may be used to implement some embodiments. System 100 includes clients 102 and 104 and a server cluster 106. Clients 102 and 104 communicate with server cluster 106 through network 108. Server cluster 106 stores information that is accessed by applications on clients 102 and 104. Clients 102 and 104 establish sessions with cluster 106 to access the information on cluster 106. Although in FIG. 1 only clients 102 and 104 are shown as communicating with cluster 106, in other embodiments there may be more than two clients accessing information from server cluster 106.

As shown in FIG. 1 server cluster 106 includes servers 106A, 106B, and 106C, which provide both high availability and redundancy for the information stored on cluster 106. In embodiments, the cluster 106 may have a file system, a database, or other information that is accessed by the clients 102 and 104. Although three servers are shown in FIG. 1, in other embodiments cluster 106 may include more than three servers, or fewer than three servers.

In accordance with one embodiment, cluster 106 generates unique identifiers 110 for files or other objects that are accessed by clients 102 and 104. The unique identifiers 110 are passed from cluster 106 to clients 102 and 104. As described in greater detail below, the unique identifiers are unique across servers 106A, 106B, and 106C. In embodiments, clients 102 and 104 establish a session for accessing information, such as files or objects, stored on server cluster 106. The session is established with one of the servers 106A, 106B, and 106C. As part of establishing the session, the server will send a session identification to the client.

As one example, client 102 may request to establish a session with server cluster 106 to access file information stored on server cluster 106. In this example, server 106A receives a request and negotiates a session with client 102. In one embodiment, the session is negotiated using a file access protocol such as a version of the server message block (SMB) protocol or a version of the network fileserver (NFS) protocol.

After the session has been established, client 102 sends a file access request to server 106A. When server 106A receives the request, it assigns a unique identifier to the file requested by the client 102 and provides the identifier to the client 102. The client 102 will include the unique identifier in any subsequent request to access the file. The identifier provided by the server 106A is unique across servers 106A, 106B, and 106C.

Server 106A is configured to generate the unique identifier. One embodiment of a unique identifier 200 is shown in FIG. 2. In the embodiments shown in FIG. 2, the unique identifier 200 includes a first portion 202 with a node identifier, which in the example above identifies server 106A. The first portion 202 of identifier 200 allows any server in server cluster 106 to determine which server generated the unique identifier 200. This portion ensures the uniqueness of any identifier 200 generated within a server cluster.

The unique identifier 200 also includes a second portion 204 with a major sequence number and a third portion 206 with a minor sequence number. For each major sequence number there is a range of minor sequence numbers that may be used. As can be appreciated, the range of numbers that can be used for the minor sequence number is dependent upon the particular structure of the unique identifier 200.

In one embodiment, the unique identifier 200 is 64 bits in length. This length may be determined by for example the particular protocol being used to access a file. In one example, if the SMB protocol is used to access files, the file identifiers generated by a server must be 64 bits long. Thus, in order to comply with the requirements of SMB, unique identifier 200 will be 64 bits long. In this embodiment, the first portion 202 of the unique identifier 200 is 8 bits long, while the second portion 204 is 24 bits long, and the third portion is 32 bits long. Embodiments are not limited to 64 bits in length. In other embodiments, the size may be different with the bit division changed to reflect the different size.

Figures 2A, 2B:
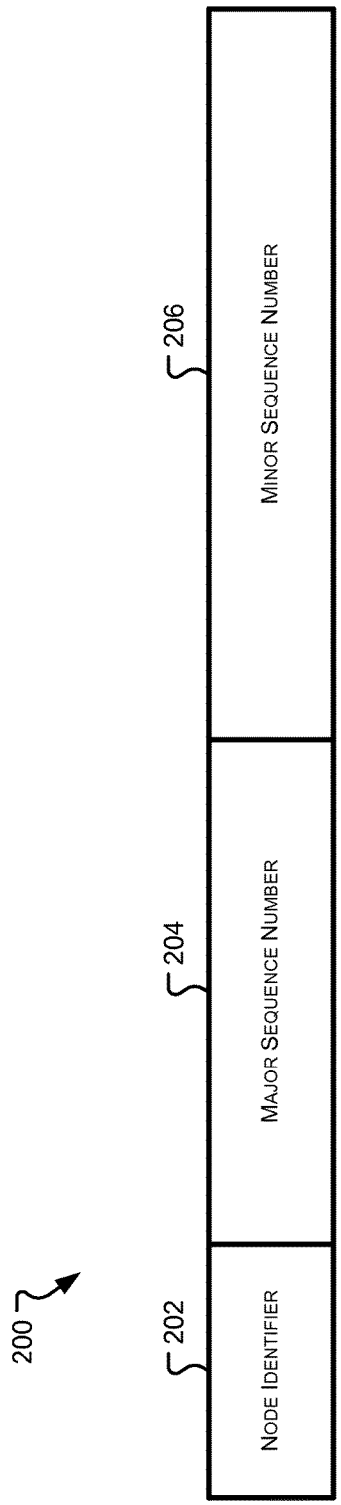
FIG. 2A illustrates a unique identifier with three different portions consistent with some embodiments.
FIG. 2B illustrates the use of a major sequence number and a range of minor sequence numbers for use in creating a unique identifier consistent with some embodiments.

FIG. 2B illustrates the concept of how the major sequence number works with the minor sequence number. Conceptually, the major sequence number will have a range of numbers that depend upon the number of bits assigned to the major sequence number. In the embodiment shown in FIG. 2B the major sequence number is within a portion that is 24 bits long and therefore the major sequence number is within a range of 0 to $2^{24}$.

Also shown in FIG. 2B, minor sequence number is within a portion that is 32 bits long and therefore the minor sequence number can be within a range of 0 to $2^{32}$. As illustrated in FIG. 2B, each major sequence number is associated with a range of minor sequence numbers. That is, for each major sequence number, $2^{32}$ unique identifiers may be generated. Once the range of minor sequence numbers are used, the major sequence number may be incremented up and again another $2^{32}$ unique identifiers may be generated by using all of the minor sequence numbers within the range. As can be appreciated, this results in a very large number of unique identifiers.

In some embodiments, the major sequence number will be incremented upward each time there is a server reboot, or a server is otherwise taken off-line and brought back online. The use of the major sequence number can in these embodiments be used to count the number of times that the cluster service restarts.

As noted above, clients 102 and 104 may use a version of the SMB protocol to connect to the server cluster 106. Version of the SMB protocol use file identifiers that contain a persistent and a volatile portion, the former remains the same across a disconnect/reconnect, while the latter changes each time the handle is re-established. The persistent portion is generated on the first open. In embodiments, the structure of identifier 200 (FIG. 2A) is used where the first portion 202 with the node identifier is part of the persistent portion of the file identifier that identifies the server on which the file was originally opened. Since the volatile portion of an SMB file identifier is regenerated at each open, it holds the identity of the server which currently has the open active.

In embodiments, the file identifier used with versions of the SMB protocol can be useful for example to support an administrative API where an administrator could close a file and the server can look at the portion of the file identifier with the node identifier and know exactly which server needs to be contacted to handle the close. This can be used in an administrative API's e.g., NetSessionClose, NetFileClose, to allow the management of a group of servers as a single server, and the server can identify which server needs to process a given request based on the node identifier.

The particular embodiments described above, such as with respect to identifier 200 with the first portion being 8 bits long, the second portion being 24 bits long, and the third portion being 32 bits long is provided merely for illustrative purposes. Embodiments are not limited to this particular segmenting of a 64-bit identifier. In other embodiments, the first portion, the second portion, and the third portion, may have different bit lengths depending upon the particular embodiment. Also, it can be appreciated that identifier 200 may be of any length and is not limited to 64 bits but may be in embodiments shorter or longer than 64 bits.

FIG. 3 illustrates a session identifier 300 that may be used in some embodiments. The session identifier 300 illustrated in FIG. 3 has two portions, a first portion 302 and a second portion 304. In some embodiments, session identifier 300 is also 64-bit in length although it may be of a different length. In the embodiment shown in FIG. 3, the first portion 302 includes a node identifier which uniquely identifies the server that created the session identifier. The use of the node identifier in the first portion offers the ability for a server in a server cluster to identify which server created a given ID when it receives it. It can determine the node identifier, and then communicate with that server if necessary to do cleanup work, etc. The session identifier is an example of a volatile identifier that is unique for the lifetime of the node that established the session, but could be recycled if that node reboots or is evicted.

As one example, if the client and server communicate using a version of the SMB protocol they may exchange a "PreviousSessionId" parameter in a SESSION_SETUP request to identify that that the client was previously connected and was later disconnected, and is now connecting again. The server must disconnect the previous session if it exists as part of establishing the new session. Since a portion of the session ID 300 contains the node identifier of the server who created the session, it allows the server to know exactly which server must be contacted to disconnect the session.

Figure 4:
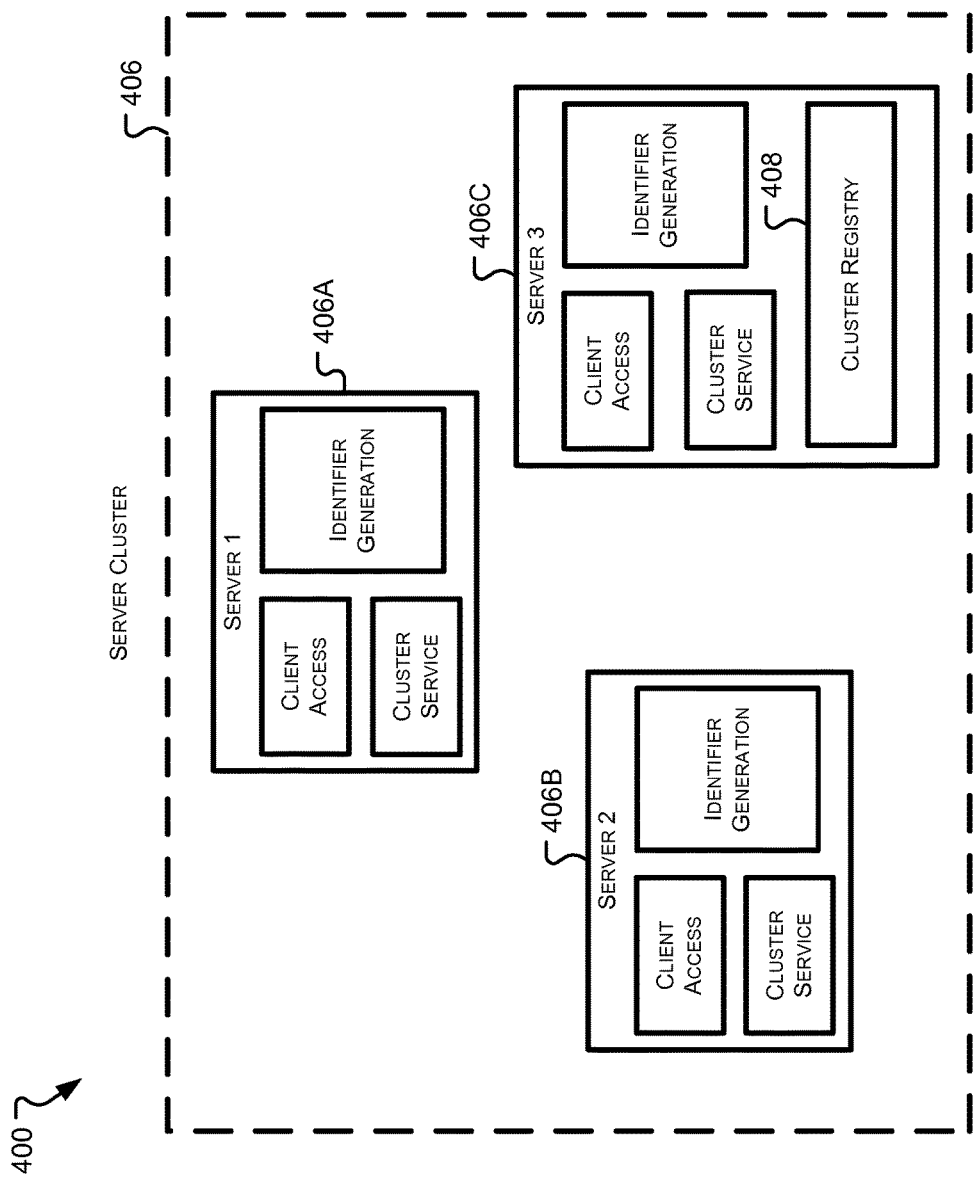
FIG. 4 illustrates a block diagram of a server cluster consistent with some embodiments.

Turning now to FIG. 4, a block diagram of a software environment 400 showing a server cluster 406 is shown in FIG. 4. FIG. 4 is shown to illustrate a general example of an environment for implementing embodiments.

As shown in FIG. 4, server cluster 406 includes three servers, 406A, 406B, and 406C. As shown in FIG. 4, each of servers 406A, 406B, and 406C include various components. For example, each server includes a client access module which communicates with clients, such as client 102 and 104 (FIG. 1) to establish sessions for allowing the clients to access file information stored on the server cluster 406. In embodiments, the client access component may implement a file access protocol such as a version of the SMB protocol.

In the embodiment shown in FIG. 4, servers 406A, 406B, and 406C also include a cluster service component that communicates with the other cluster service components. The cluster service components, in embodiments, provide a number of functions within cluster 406. For example, the cluster service components can provide information about a server to allow cluster 406 to balance the load among servers 406A, 406B, and 406C. As another example, the cluster service components can be used to provide information that allows for failover for any server that fails. In addition, the cluster service components are used to reserve major sequence numbers for identifiers, such as identifier 200 shown in FIG. 2.

Each of servers 406A, 406B, and 406C also include an identifier generation component. The identifier generation component generates unique identifiers associated with files or file handles that are provided to clients that request access to files. The unique identifiers are unique across all of the servers in cluster 406. That is, no identifier will be exactly the same, which prevents collisions among the identifiers. The identifier generation components include the logic necessary for determining the particular major sequence number and minor sequence number to include in a unique file identifier. Additionally, the identifier generation component on each of servers 406A, 406B, and 406C communicates with the local cluster service component to reserve additional major sequence numbers in a cluster registry 408.

In the embodiment shown in FIG. 4, the cluster registry 408 is on server 406C. The cluster registry 408 stores configuration information for the cluster service. Accordingly, the cluster service components on each of servers 406A, backspace and server 406B communicate with the cluster service component on server 406C to store or retrieve configuration information from the cluster registry 408. In one embodiment, cluster registry 408 is used to reserve major sequence numbers that are used by identifier generation components in the cluster 406 to generate unique identifiers. Accordingly, when the range of minor sequence numbers have been used, the identifier generation component on a server will communicate with the local cluster service component which requests from the cluster service component on the server 406C to reserve in the cluster registry 408 the next major sequence number.

As one example, assume that server 406A receives a request from a client to access file information stored on cluster 406. The client access component on server 406A will communicate with the client and establish a session that allows the client to access file information. After establishment of the session, the client will send a request to access a file. In response to receiving the request, the client access component on server 406A will request an identifier from the identifier generation module on server 406A. The identifier generation module will determine the appropriate node identifier, major sequence number, and minor sequence number to include in the unique identifier. After generating the unique identifier, the identifier generation component will pass the unique identifier to the client access component which will in turn provide the unique identifier to the client.

After a series of requests from the client, the identifier generation component will determine that all of the minor sequence numbers have been used in previous unique identifiers and will then request from the client service component on server 406A to reserve the next major sequence number. The cluster service component on server 406A will then communicate with the cluster service component on server 406A to request reservation of the next major sequence number within registry 408. The cluster service component on server 406C will then provide a response to the cluster service component on 406A indicating that the next major sequence number has been reserved in the cluster registry 408. The cluster service component within server 406A will provide an indication to the identifier generation component that the next major sequence number has been reserved in cluster registry 408. The identifier generation component on server 406A can then begin to use the next major sequence number and start from the beginning of the range of minor sequence numbers.

In some embodiments, one of servers 406A or 406B may fail or otherwise be taken off-line and then later brought back online. When the server is brought back online, and the client access component on that server receives a request for a file, the identifier generation component on that server will request from the local cluster service component a request for the next major sequence number. The local cluster service component will then follow the process previously described for reserving the next major sequence number from the cluster registry 408. The cluster registry 408 can therefore be used in these embodiments to keep track of the number of reboots that a server has undergone.

The above description is provided merely to illustrate embodiments. It should be understood that although the server cluster 406 in FIG. 4 is shown with only three servers, in other embodiments server cluster 406 will include more than three servers. Also, in embodiments cluster 406 may include more than one server with a cluster registry 408. The cluster registry may be replicated to other servers to allow for failover and redundancy with respect to the cluster registry.

Figure 5:
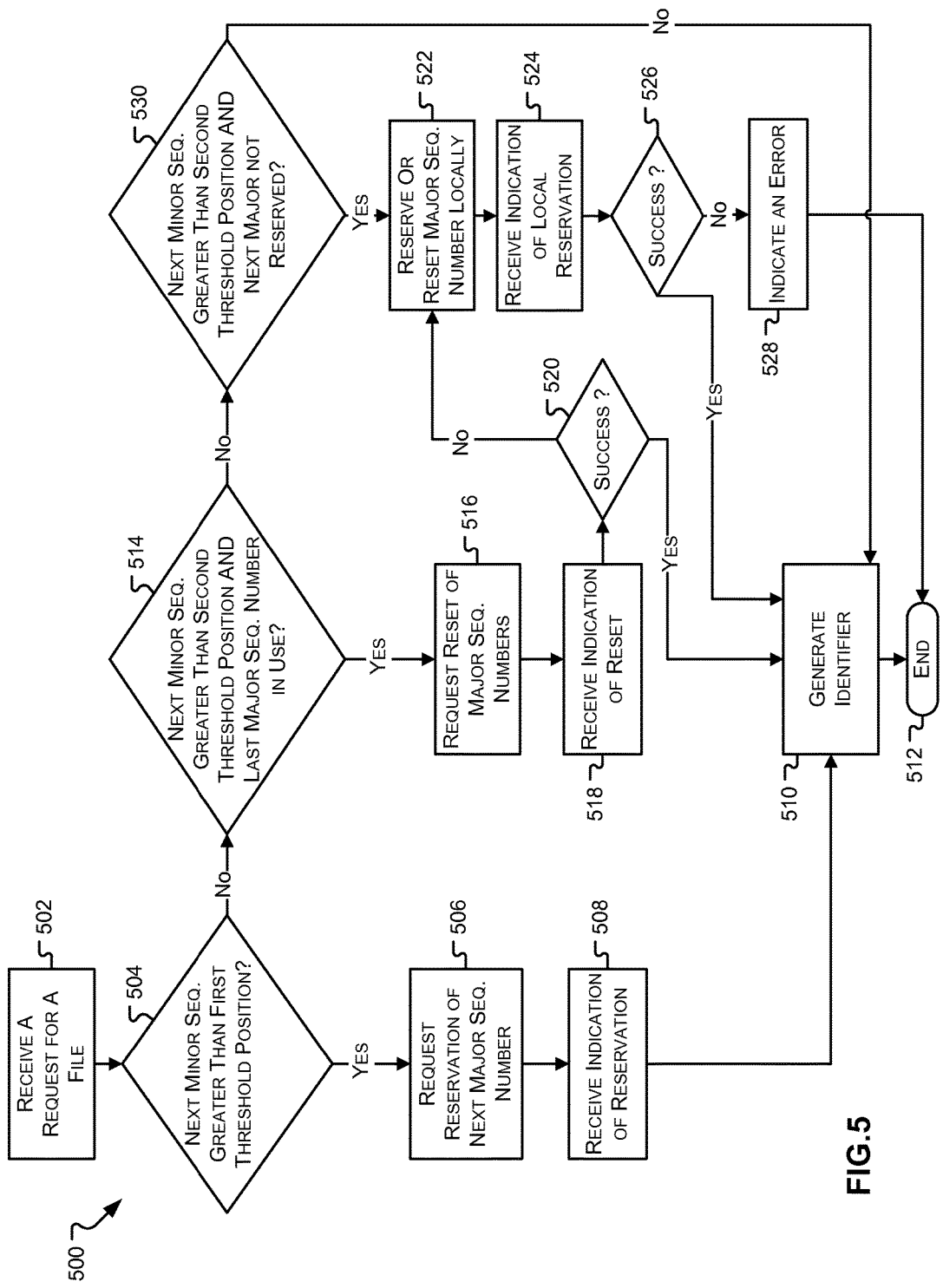
FIG. 5 illustrates an operational flow for determining whether to reserve major sequence numbers consistent with some embodiments.
Figure 6:
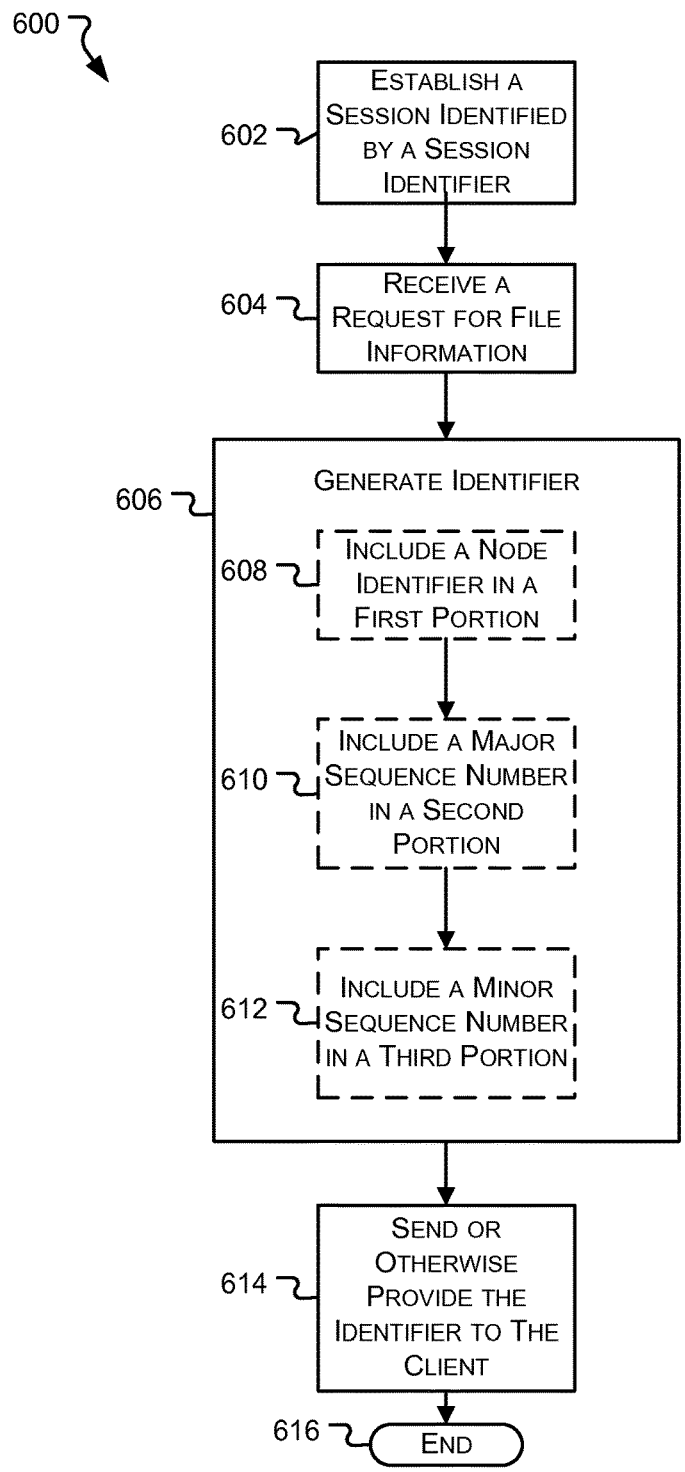
FIG. 6 illustrates an operational flow for providing unique identifiers consistent with some embodiments.

FIGS. 5 and 6 illustrate operational flows 500 and 600 according to embodiments. Operational flows 500 and 600 may be performed in any suitable computing environment. For example, the operational flows may be executed by systems and environments such as illustrated in FIGS. 1 and 4 therefore, the description of operational flows 500 and 600 may refer to at least one of the components of FIGS. 1 and 4. However, any such reference to components of FIGS. 1 and 4 is for descriptive purposes only, and it is to be understood that the implementations of FIGS. 1 and 4 are non-limiting environments for operational flows 500 and 600.

Furthermore, although operational flows 500 and 600 are illustrated and described sequentially in a particular order, in other embodiments, the operations may be performed in different orders, multiple times, and/or in parallel. Further, one or more operations may be omitted or combined in some embodiments.

Operational flow 500 is illustrated to show the various steps that may be performed in determining the appropriate major sequence number and minor sequence number for including in a unique identifier. In embodiments, the identifier generation components of servers 406A, 406B, and 406C (FIG. 4) described above may implement operational flow 500.

Flow 500 begins at operation 502 where a request to access a file is received. Operation 502 is in embodiments preceded by a number of other steps such as negotiating a session. The session may be negotiated using a file access protocol such as a version of the SMB protocol. In other embodiments, operation 502 is preceded by a number of previous requests to access a number of different files. In response to the request received at operation 502, a unique identifier must be generated to identify the file that is being accessed.

As shown in the embodiment in FIG. 5, operational flow passes from operation 502 to decision 504 where a decision is made as to whether the next minor sequence number to be used for a unique identifier is at a first threshold position. In some embodiments, as noted with respect to FIG. 4, when a range of minor sequence numbers has been used, the major sequence number is incremented. Reserving a next major sequence number requires in embodiments sending a message to another server in the cluster that may include a cluster registry to reserve the next major sequence number.

To avoid being in a situation where generating a unique identifier must be paused until there is an approval for reserving the next major sequence number, decision 504 determines whether the next minor sequence number is at a threshold position from the end of the range of minor sequence numbers. This allows the reservation request to be sent early and asynchronously.

If at decision 504 it is determined that the next minor sequence number that is to be included in the unique identifier is greater that a first threshold position, flow passes to operation 506 where a request to reserve the next major sequence number is sent. At operation 508 an indication of the reservation is received. The indication received at operation 508 may be an approval indication which would allow the major sequence number to be incremented when necessary, i.e., when the minor sequence numbers have all been used. In other embodiments, the indication received at operation 508 may not be an approval of the next major sequence number. This may occur for example if the server that includes the cluster registry is unavailable. Flow 500 passes from operation 508 to operation 510 where a unique identifier is generated. Flow ends at 512.

If at decision 504 a determination is made that the minor sequence number is not greater than a first threshold position, flow 500 passes to decision 514 where a determination is made whether the next minor sequence number to be included in a unique identifier is greater than a second threshold position and the last major sequence number is already in use. The second threshold position is closer to the end of the minor sequence number range than the first threshold position which is used in decision 504. Being closer to the end of the range is a more urgent situation for securing a reservation of a next major sequence number. If the minor sequence numbers run out, and no major sequence number has been reserved, no more unique identifiers can be generated. This may result in an error where there is a delay in generating identifiers and thus in responding to request from a client to access files.

Decision 514 also takes into account whether the last major sequence number is currently in use. As shown in FIG. 2, the major sequence numbers are also limited to a certain range of numbers. Accordingly, once the major sequence numbers have all been used they must be reset. Therefore if at decision 514 a determination is made that the next minor sequence number to be used is greater than the second threshold position and the last major sequence numbers currently in use then flow 500 passes to operation 516. A request to reset the major sequence numbers is sent at operation 516. This request may be in embodiments sent by a cluster service component to another server which includes a cluster registry.

After operation 516, flow passes to operation 518 where an indication is received as to whether or not the major sequence numbers have been reset. Flow passes from operation 518 to decision 520 ray determination is made as to whether or not the indication received at 518 indicates whether the major sequence numbers have been successfully reset. If at decision 520 a determination is made that the major sequence numbers have been successfully reset, flow passes to operation 510 where the unique identifiers generated. Flow then ends at 512.

If however, a determination is made at decision 520 that the indication from operation 518 indicates that the major sequence number has not been reset, flow passes to operation 522 where a local reservation is provided. Operation 522 is meant to deal with situations in which for example there is a problem with accessing a cluster registry and the ability to reserve a major sequence number or to reset the major sequence numbers. When faced with this situation, embodiments will still be able to generate some type of identifiers by reserving or resetting major sequence numbers locally. This avoids situations in which no unique identifiers can be generated and the system stops generating identifiers for access requests.

On servers that are not part of a cluster, unique file identifiers are, in embodiments, also generated the same way as servers that are part of a cluster. However, the node identifier equals zero and the major sequence number is stored in the regular registry. On a server that is part of a cluster, if the cluster registry fails to update after the first threshold is reached and the cluster service is not running, then the local registry key (not the cluster registry key) is read to get the major sequence number that is used to generate the next unique file identifiers. When the second threshold is reached, a unique identifier, using the node identifier zero, will be generated. If the cluster service was running when the first request is sent, another request can be sent to update the cluster registry but if the cluster registry fails to update this time, no new unique file identifiers will be generated. Instead, an event will be fired so an administrator can resolve the issue by restarting the cluster service or the machine because such situation indicates a serious error.

Referring once again to FIG. 5, flow passes from operation 522 to 524 where an indication is received regarding the reservation or resetting of the major sequence number locally. After operation 524, flow passes to decision 526 where a determination is made as to whether the indication received at operation 524 indicates that the major sequence number has been successfully reset or reserved. If there is an indication that the major sequence number has been reset or reserved locally then flow passes to operation 510 where a unique identifier is generated. Flow then ends at 512.

If at decision 526 a determination is made that a reset or a reservation of the major sequence number was not successful, and then flow passes to operation 528 where an error indication occurs. This may result for example in a notification to an administrator or some other action or event to correct the error. Flow then ends at 512.

Referring back to decision 514, if a determination is made that the next minor sequence number to be used in generating a unique identifier is not greater than the second threshold or the major sequence number that is currently in use is not the last major sequence number, flow 500 passes to decision 530. At decision 530 a determination is made as to whether the next minor sequence number to be included in the unique identifier is greater than the second threshold position and the next major sequence number has not been reserved. As noted before, being at a second threshold which is closer to the end of the range of minor sequence numbers is a more urgent situation. If previous attempts have been made to reserve the next major sequence number but have been unsuccessful, then a situation can potentially occur that would prevent the generation of any identifier and thus possibly result in not providing responses to file access requests. As can be seen, if a determination is made at decision 530 that the next minor sequence number is greater than the second threshold position and the next major sequence number has not been reserved, flow will pass to operation 522, operation 524, decision 526 and operation 528 as described above.

However if at decision 530 a determination is made that the next minor sequence number to be used is not greater than the second threshold or that the next major sequence has not, not been reserved, flow 500 passes to operation 510 where the unique identifiers generated. Flow then ends at operation 512.

One feature of the embodiment shown in FIG. 5 is the quickness with which the determinations can be made for most situations. For example, if the next minor sequence number to be used in a unique identifier is not greater than the first or the second threshold flow will quickly pass from decision 504, to decision 514, to decision 530, and finally to operation 510 with the unique identifiers generated. This embodiment allows for the unique identifiers to be generated quickly in most situations.

As noted above, in embodiments, flow 500 is performed by an identifier generation component that is included on a number of servers in a cluster. It should be understood that in some embodiments, flow 500 may be implemented in other types of environments than the one shown in FIGS. 1 and 4.

Operational flow 600 illustrates steps for sending or providing the unique identifier to a client. Operations of flow 600 may be combined in embodiments with various one or more operations of flow 500 shown in FIG. 5 and described above. For example, as described in greater detail below flow 600 includes an operation for generating an identifier. This operation may be combined with flow 500 as operation 510 described above and shown in FIG. 5. This is merely one example and various combinations of the operations in flows 500 and 600 are possible.

Flow 600 begins at operation 602 where a session is established with a client to allow the client to access file information. The session may be established using for example a version of the SMB protocol. The session established at operation 602 can be identified with a session identifier. The session identifier can be included in communications from the client so that a server, even a different server of the cluster, can identify the particular session that has been established with client.

After operation 602, flow 600 passes to operation 604 where a request for file information is received. The request may be formatted according to the same file access protocol, e.g., a version of the SMB protocol. As noted above, a unique identifier is generated in embodiments to identify the file that is requested. Operation 606 generates the unique identifier.

As shown in FIG. 6, generating an identifier at operation 606 may include a number of sub operations. In the embodiment shown in FIG. 6, operation 606 includes sub operation 608 in which a node identifier is included in a first portion of the unique identifier. Operation 606 also includes a sub operation 610 where a major sequence number is included in a second portion of the unique identifier. At sub operation 612, a minor sequence number is included in a third portion of the unique identifier. In embodiments, portions of flow 500 may be performed before the generate identifier operation 606. That is, before generating the unique identifier, a determination may be made as to whether a major sequence number should be reserved for generating future unique identifiers.

In other embodiments, the three optional sub operations (608-612) are not performed. Rather, the first time a unique identifier is generated, the node identifier is set and the remaining portions, such as the sequence number, are incremented every time a new unique file identifier is generated. There may be logic to check on thresholds and boundaries which may result in creating a completely new unique file identifier if a new decision is taken such as to change the node identifier portion, then a new 64 bit identifier may be created and used to create the next requested unique file identifier by simply incrementing it.

As shown in the embodiment in FIG. 6, operational flow passes from operation 606 to operation 614 where the identifier is either sent to the client or otherwise provided to the client to identify the file that the client has requested. Flow 600 ends at 616.

Figure 7:
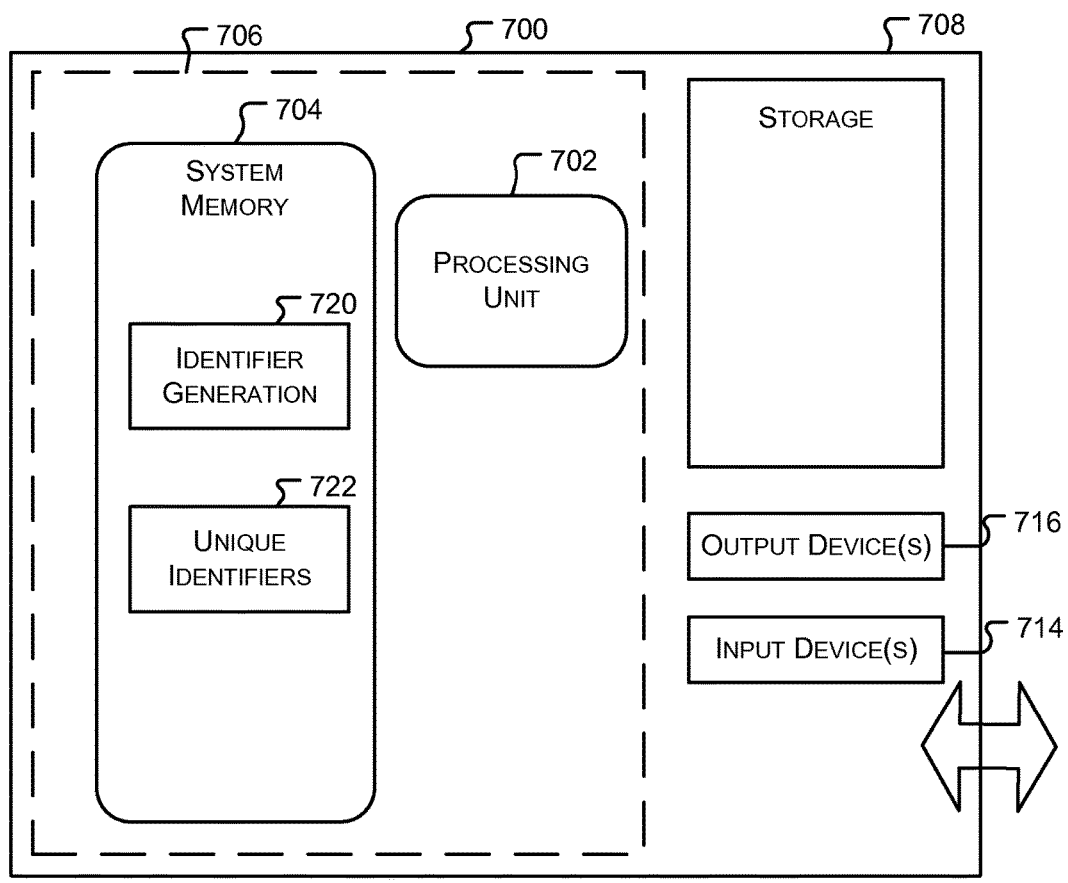
FIG. 7 illustrates a block diagram of a computing environment suitable for implementing embodiments.

FIG. 7 illustrates a general computer system 700, which can be used to implement the embodiments described herein. The computer system 700 is only one example of a computing environment and is not intended to suggest any limitation as to the scope of use or functionality of the computer and network architectures. Neither should the computer system 700 be interpreted as having any dependency or requirement relating to any one or combination of components illustrated in the example computer system 700. In embodiments, system 700 may be used as a client and/or server described above with respect to FIG. 1.

In its most basic configuration, system 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. System memory 704 stores applications that are executing on system 700. For example, memory 704 may store identifier generation component 720 that generates unique identifiers for files that are requested. Memory 704 may also include the unique identifiers 722.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage, and non-removable storage 708 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 714 such as a keyboard, a mouse, a pen, a sound input device, a touch input device, etc. Output device(s) 716 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A computer implemented method of providing an identifier, the method comprising:
    receiving, at a first server of a cluster, a first request for a first file;
    generating a first identifier associated with the first file, wherein the first identifier comprises:
        a node identifier in a first portion of the first identifier identifying a server on which the first file was originally opened;
        a first major sequence number in a second portion of the first identifier, the first major sequence number being within a first range of numbers, wherein the first major sequence number is incremented in response to a first event; and
        a first minor sequence number in a third portion of the first identifier, the first minor sequence number being within a second range of numbers, wherein the first minor sequence number is incremented in response to a second event, and wherein the second event is different from the first event;
    sending the first identifier;
    receiving, at the first server of the cluster, a second request for a second file;
    sending a request to a cluster service to reserve an incremented major sequence number;
    receiving a response from the cluster service indicating that the incremented major sequence number has been reserved; and
    generating a second identifier associated with the second file, wherein the second identifier comprises:
        the node identifier in a first portion of the second identifier;
        the incremented major sequence number in a second portion of the second identifier; and
        a second minor sequence number in a third portion of the second identifier, the second minor sequence number being at the beginner of the second range of numbers; and
    sending the second identifier.

2. The computer implemented method of claim 1, further comprising:
    receiving, at the first server of the cluster, a third request for a third file;
    generating a third identifier associated with the third file, wherein the third identifier comprises:
        the node identifier in a first portion of the third identifier;
        the incremented major sequence number in a second portion of the third identifier; and
        an incremented minor sequence number in a third portion of the third identifier.

3. The method of claim 2, wherein the first identifier and the second identifier are each 64 bits long.

4. The method of claim 3, wherein the first portion of the first identifier and the first portion of the second identifier are each 8 bits in length.

5. The method of claim 4, wherein the second portion of the first identifier and the second portion of the second identifier are each 24 bits in length.

6. The method of claim 5, wherein the third portion of the first identifier and the third portion of the second identifier are each 32 bits in length.

7. The method of claim 1, wherein the method further comprises determining whether the first minor sequence number used in the first identifier is at a predetermined position from an end of the second range of numbers.

8. The method of claim 1, wherein the method further comprises determining that a cluster service on the cluster has been restarted since the first identifier was generated.

9. A computer readable storage device comprising computer executable instructions that, when executed by at least one processor, perform a method of providing an identifier to a client, the method comprising:
    generating a first 64-bit identifier associated with a first file, wherein the first 64-bit identifier comprises:
        a node identifier in a first portion of the first 64-bit identifier, wherein the node identifier identifies a server on which the first file was originally opened;

a first major sequence number in a second portion of the first 64-bit identifier, the first major sequence number being within a first range of numbers, wherein the first major sequence number is incremented in response to a first event; and
a first minor sequence number in a third portion of the first 64-bit identifier, the first minor sequence number being within a second range of numbers, wherein the first minor sequence number is incremented in response to a second event, and wherein the second event is different from the first event;
providing the first 64-bit identifier to a client;
sending a request to a cluster service to reserve an incremented major sequence number which is incremented from the first major sequence number;
receiving a response from the cluster service indicating that the incremented major sequence number has been reserved; and
generating a second 64-bit identifier associated with a second file, wherein the second 64-bit identifier comprises:
the node identifier in a first portion of the second 64-bit identifier;
the incremented major sequence number in a second portion of the second 64-bit identifier, the incremented major sequence being within the first range of numbers; and
a second minor sequence number in a third portion of the second 64-bit identifier, the second minor sequence number being a first number in the second range of numbers.

10. The computer readable storage device of claim 9, wherein the method further comprises:
determining whether the first minor sequence number used in the first 64-bit identifier is at a predetermined position from an end of the second range of numbers.

11. The computer readable storage device of claim 9, wherein the method further comprises providing a session identifier to a client to establish a session for exchanging information, wherein the session identifier comprises a node identifier.

12. The computer readable storage device of claim 11, wherein the session is established using a version of the server message block (SMB) protocol and the session is used to provide file information to the client.

13. A computer system for providing file information to a client, the system comprising:
a plurality of servers in a cluster, wherein at least a portion of the plurality of servers are configured to:
establish a session with a client to provide access to file information stored on the cluster;
receive a first request from a client for access to a first file;
in response to receiving the first request, generate a first 64-bit identifier associated with the first file, wherein the first 64-bit identifier comprises:
a server identifier in a first portion of the first 64-bit identifier, wherein the server identifier identifies a first server from the plurality of servers in the cluster on which the first file was originally opened;
a first major sequence number in a second portion of the first 64-bit identifier, the first major sequence number being within a first range of numbers, wherein the first major sequence number is incremented in response to a first event; and
a first minor sequence number in a third portion of the first 64-bit identifier, the first minor sequence number being within a second range of numbers, wherein the first minor sequence number is incremented in response to a second event, and wherein the second event is different from the first event;
provide the first 64-bit identifier to a client;
sending a request to a cluster service to reserve an incremented major sequence number;
receiving a response from the cluster service indicating that the incremented major sequence number has been reserved; and
generating a second 64-bit identifier associated with a second file, wherein the second 64-bit identifier comprises:
the node identifier in a first portion of the second 64-bit identifier;
the incremented major sequence number in a second portion of the second 64-bit identifier; and
a second minor sequence number in a third portion of the second 64-bit identifier, the second minor sequence number being at the beginner of the second range of numbers.

14. The system of claim 13, wherein the portion of the plurality of servers are further configured to provide a session identifier to the client to establish the session, wherein the session identifier comprises a node identifier.

15. The system of claim 14, wherein the session is established using a version of the server message block (SMB) protocol and the session is used to provide file information to the client.

16. The system of claim 13, wherein the portion of the plurality of servers are further configured to determine whether the first minor sequence number used in the first 64-bit identifier is at a predetermined position from an end of the second range of numbers.

17. The system of claim 13, wherein the first portion of the first identifier and the first portion of the second identifier are each 8 bits in length.

18. The system of claim 13, wherein the second portion of the first identifier and the second portion of the second identifier are each 24 bits in length.

19. The system of claim 13, wherein the third portion of the first identifier and the third portion of the second identifier are each 32 bits in length.

20. The method of claim 1, wherein the method further comprises providing a session identifier to a client to establish a session for exchanging information, wherein the session identifier comprises a node identifier.

* * * * *